Patented Sept. 13, 1932

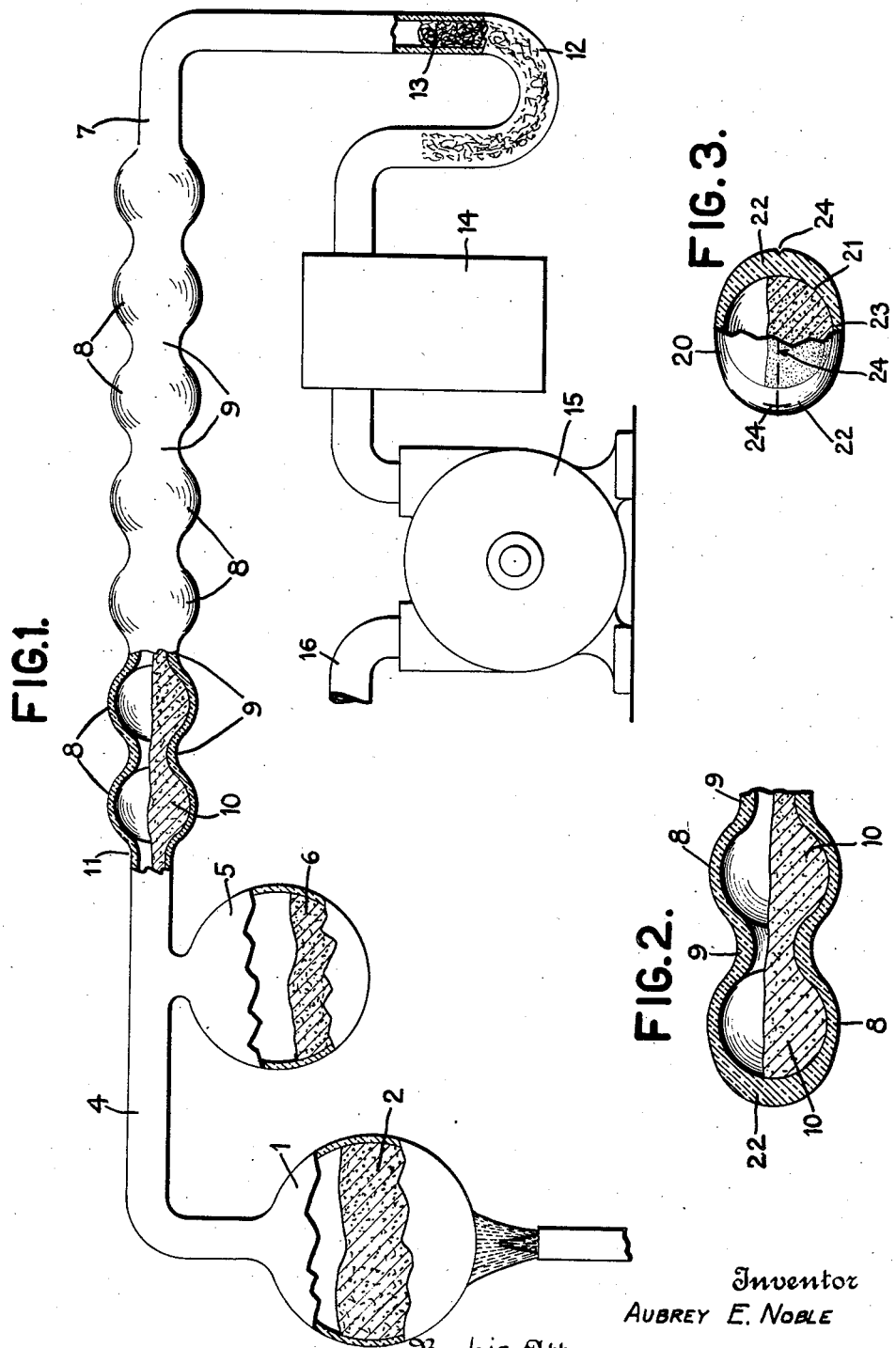

1,877,726

UNITED STATES PATENT OFFICE

AUBREY E. NOBLE, OF LYNBROOK, NEW YORK, ASSIGNOR TO CLAUDE NEON LIGHTS, INC., OF NEW YORK, N. Y., A CORPORATION OF NEW YORK

CAPSULE

Application filed December 12, 1929. Serial No. 413,481.

This invention relates to the making of capsules and in particular to the making of glass capsules in which a material is sealed for convenience in handling and also for safety if the material is one which is dangerous or difficult to handle or for preserving the material if it is likely to change its character due to exposure to the air or moisture of the air. By sealing the material within a capsule so that the material is not in contact with the air and moisture in the air, this material is available in its desired pure state for handling or for use where desired merely breaking the capsule to liberate the material.

An object of the invention is to provide a method for sealing materials within capsules.

Another object of the invention is to devise a process wherein a plurality of such capsules may be produced at the same time.

Another object of the invention is to devise a capsule within which a material may be preserved by sealing the material within the capsule casing which may be broken to liberate the material within the capsule at any time and where desired.

The invention will be more apparent from the following detailed description thereof taken in connection with the following drawing in which:

Figure 1 shows the apparatus by which the capsules may be made and charged with material.

Figure 2 shows one end of a capsule sealed and severed from the apparatus with the material contained therein.

Figure 3 is a partial section of the finished sealed capsule with the material therein.

In practicing the method of manufacturing the capsules described herein, a vessel 1 which is preferably a glass container, is provided with the material 2 such as sodium, potassium, or caesium, in more or less impure form. This material is heated under a flame 3 so that it volatilizes and its vapors pass out of the vessel 1 and through the tube 4 and condense in its pure state in a second container 5 of glass since the impurities in the first container do not volatilize and pass to the second vessel or chamber. The pure material 6 is shown condensed in the second vessel.

An elongated glass tube 7 having successive bulbous portions 8 connected together by the narrow necks 9 is attached to the second chamber 5 so that both chambers and the bulbous tube 7 are in effect a single piece of apparatus. At the end of the bulbous tube 7 is provided a U-shaped trap 12 having glass wool 13 therein and this may be followed by a chamber 14 containing phosphorous oxide which chamber is connected with a vacuum pump 15. The glass wool 13 and the chamber 14 are provided to prevent the vapors from passing into the vacuum pump. An exhaust 16 discharges the gases from the vacuum pump as they are drawn from the apparatus.

In preparing the capsules the apparatus is evacuated by the pump 15 and upon the air being removed the material 2 in the first chamber is heated. This material, by way of example, may be potassium which will be referred to as a material which illustrates the process and the invention is applicable to other materials as well. A Bunsen burner flame is sufficient to heat the material. The potassium vaporizes and passes into the second chamber 5 and condenses therein in practically a pure state. When the second chamber 5 is filled with sufficient pure potassium 6, this second chamber is heated in turn and the potassium volatilizes and is drawn through the bulbous tube 7 with its bulbous portions 8 by the pump which continues its operation after the heating of the material has begun. The vapor condenses within the bulbous tube as pure potassium 10, the greater part of the vapors depositing in the bulbous portions. Obviously, the bulbs nearest to the second container 5 will receive the greatest deposit of the condensed vapors so that these first bulbous portions of the tube are also heated to vaporize the deposited potassium so that it will distribute itself uniformly in the bulbous portions more distant from the second chamber.

When the pure potassium 10 has been uniformly deposited in the various bulbous portions 9 of the tube, the tube adjacent to the first bulbous portion at the point 11 is heated so that it contracts sealing this end of the bulbous portion and severs it from the second chamber and its connecting tube 4 as shown in Figure 2. This first bulbous portion is then sealed and severed from the second bulbous portion by heating the neck 9 separating these two portions which become soft and contracts and completely seals the first bulbous portion and also severs it from the second bulbous portion 8. This severed bulbous portion 8 comprises the finished capsule shown in Figure 3 in which is sealed the pure potassium 21 deposited therein. This pure potassium is sealed from contact with the air and is readily handled. The space 25 not filled by potassium is an evacuated space since the capsule was sealed when evacuated.

The capsule formed by the severed bulbous portions 8 containing the metallic potassium sealed therein is readily handled and may be placed where desired. In order to liberate the potassium from the capsule it is only necessary to break the shell. This may be accomplished by subjecting the capsule to heat and the heat being applied in any known way thereto.

In order to make the capsule more easily broken when subjected to heat the bulbous tube 7 is formed by blowing the successive bulbous portions 8 from a cylindrical tube 7 of the diameter of the necks 9. The tube 7 is heated at intervals and blown to form the bulbous portions which therefore have a thinner wall as compared with the thickness of the walls at the necks 9 between successive bulbous portions. Now when each bulbous portion is separated and sealed from its adjacent bulbous portion 8, the neck 9 is heated until it becomes plastic and closes the opening connecting the adjacent bulbs and is then severed. The relatively thick wall of the neck flows to form relatively thick walled ends 22 for the capsule whereas the other walls 23 remain thinner. Now these thick walled ends of the capsule are given one or more scratches 23 such as by line or a cross or in any manner and other scratches may be provided in the thin walls 23 of the finished capsule.

Now when this scratched glass wall of the capsule is subjected to heat unequal strains are set up in the thick ends 22 of the capsule which strains augmented by the weakening scratches 24 crack the capsule and liberate the potassium therein. A method in which such capsules may be used and several ways in which the capsules may be subjected to heat to liberate their contents is described in my copending application No. 413,480 filed on even date herewith.

The metal or other material to be deposited in the bulbous tube 7 need not be vaporized in order to fill the bulbs 8. The material such as potassium may be heated so that it flows freely. The material is then allowed to flow into the bulbous tube to fill the bulbs 8.

Having described my invention it will be apparent that various modifications may be made in the process and the article without deviating from the scope thereof and it is to be understood that the invention is not to be limited by the specific examples described herein except as limited by the accompanying claims.

What is claimed is:

1. A method of forming a capsule having a material sealed therein comprising, evacuating a tube having a series of bulbous portions, vaporizing the material to be sealed in the capsules, leading the vaporized material into the bulbous tube, condensing the vapor therein, sealing the bulbous portions, and severing the sealed bulbous portions from each other.

2. A method of forming a capsule having a material sealed therein comprising, vaporizing the material to be sealed in the capsule, condensing the vapor in a tube having a series of bulbous portions separated by tubular necks, sealing the necks, and severing each bulbous portion from the other portions at the neck.

3. A method of forming a capsule having potassium sealed therein comprising, connecting a bulbous tube with a vessel having pure potassium therein, vaporizing the potassium in the vessel, condensing the vapor in the bulbous tube, and sealing and severing each bulbous portion from the tube.

4. A method of forming a capsule having potassium sealed therein comprising, connecting a bulbous tube with a vessel having pure potassium therein, evacuating the vessel and bulbous tube, vaporizing the potassium in the vessel, condensing the vapor in the bulbous tube, and sealing and severing each bulbous portion from the tube.

In testimony whereof I affix my signature.

AUBREY E. NOBLE.